(12) United States Patent
Ono et al.

(10) Patent No.: US 9,284,918 B2
(45) Date of Patent: Mar. 15, 2016

(54) HYBRID EXHAUST GAS TURBOCHARGER

(71) Applicant: MITSUBISHI HEAVY INDUSTRIES, LTD., Tokyo (JP)

(72) Inventors: Yoshihisa Ono, Tokyo (JP); Keiichi Shiraishi, Tokyo (JP); Yasuhiro Wada, Tokyo (JP); Masayoshi Tagawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/370,868

(22) PCT Filed: Jan. 7, 2013

(86) PCT No.: PCT/JP2013/050045
§ 371 (c)(1),
(2) Date: Jul. 7, 2014

(87) PCT Pub. No.: WO2013/105529
PCT Pub. Date: Jul. 18, 2013

(65) Prior Publication Data
US 2015/0135707 A1 May 21, 2015

(30) Foreign Application Priority Data

Jan. 12, 2012 (JP) ................................. 2012-004297

(51) Int. Cl.
*F02B 33/44* (2006.01)
*F02M 25/07* (2006.01)
(Continued)

(52) U.S. Cl.
CPC ............. *F02M 25/0706* (2013.01); *F01D 3/00* (2013.01); *F01D 25/16* (2013.01); *F01D 25/18* (2013.01);
(Continued)

(58) Field of Classification Search
CPC ...... F02M 25/0706; F01D 3/00; F01D 25/16; F01D 25/06; F02B 37/00; F02B 37/10; F02B 39/10; F02B 39/14; F02B 63/04; F02B 39/00; F02C 6/12; H02K 5/1672; H02K 7/1823; H02K 2205/03; F05D 2220/76; Y02T 10/144

USPC .............. 184/6.11, 11; 60/605.1, 605.3, 607, 60/608, 609; 417/407, 365
See application file for complete search history.

(56) References Cited

U.S. PATENT DOCUMENTS 1,420,076 A * 6/1922 Bouche .................. H02K 21/38
290/40 R
6,305,169 B1 * 10/2001 Mallof ..................... F01D 15/10
60/608

(Continued)

FOREIGN PATENT DOCUMENTS

CN 101225766 7/2008
JP 60-44483 10/1985

(Continued)

OTHER PUBLICATIONS

Decision to Grant a Patent issued Apr. 27, 2015 in corresponding Korean patent application No. 2014-7018574 (with English translation).

(Continued)

*Primary Examiner* — Patrick Maines
(74) *Attorney, Agent, or Firm* — Wenderoth, Lind & Ponack, L.L.P.

(57) ABSTRACT

A hybrid exhaust gas turbocharger is provided, which is capable of preventing the supercharger from being damaged due to a rotary shaft being moved to a large extent in an axial direction by vibration generated from the internal combustion engine and a rotary portion in contact with a stationary portion in the supercharger when the supercharger is mounted on an internal combustion engine. A restraint mechanism (35) including a thrust collar (41) attached to a shaft end of a rotary shaft (19a) of a generator positioned on a side opposite to a flexible coupling and two thrust bearings (42) disposed to oppose both end surfaces forming a flange portion (44) of the thrust collar (41) is accommodated in a recess (51) formed on a front surface side of a shell housing positioned on a side opposite to the casing.

4 Claims, 3 Drawing Sheets

(51) Int. Cl.
*F02B 37/10* (2006.01)
*F02B 39/14* (2006.01)
*H02K 5/167* (2006.01)
*H02K 7/18* (2006.01)
*F02B 39/10* (2006.01)
*F01D 25/16* (2006.01)
*F02C 6/12* (2006.01)
*F01D 3/00* (2006.01)
*F02B 37/00* (2006.01)
*F02B 63/04* (2006.01)
*F01D 25/18* (2006.01)

(52) U.S. Cl.
CPC ............... *F02B 37/00* (2013.01); *F02B 37/10* (2013.01); *F02B 39/10* (2013.01); *F02B 39/14* (2013.01); *F02B 63/04* (2013.01); *F02C 6/12* (2013.01); *H02K 5/1672* (2013.01); *H02K 7/1823* (2013.01); *F05D 2220/40* (2013.01); *F05D 2220/76* (2013.01); *F05D 2240/52* (2013.01); *H02K 2205/03* (2013.01); *Y02T 10/144* (2013.01)

(56) References Cited

U.S. PATENT DOCUMENTS

| | | | |
|---|---|---|---|
| 7,692,326 B2* | 4/2010 | Ono et al. | 290/52 |
| 8,257,059 B2* | 9/2012 | Cho et al. | 417/371 |
| 2003/0223892 A1* | 12/2003 | Woollenweber | F01D 15/10 417/407 |
| 2004/0200215 A1* | 10/2004 | Woollenweber et al. | F01D 15/10 60/407 |
| 2006/0061222 A1* | 3/2006 | McAuliffe et al. | H02K 7/083 310/60 R |
| 2008/0203732 A1* | 8/2008 | Ono et al. | F01D 5/026 290/52 |
| 2008/0236261 A1* | 10/2008 | Ono et al. | 73/112.01 |
| 2009/0241542 A1* | 10/2009 | Ono et al. | 60/624 |
| 2010/0212643 A1* | 8/2010 | Goedecke et al. | F01D 5/025 123/565 |
| 2010/0281863 A1* | 11/2010 | Shiraishi | F02B 37/007 60/605.1 |
| 2011/0126536 A1* | 6/2011 | Lofgren | F02B 37/105 60/607 |
| 2011/0135519 A1* | 6/2011 | Cho et al. | F04D 17/10 417/423.7 |
| 2011/0239648 A1* | 10/2011 | Shiraishi | F01D 25/18 60/605.3 |
| 2012/0180480 A1* | 7/2012 | Kapich | F02B 37/10 60/606 |
| 2012/0180481 A1* | 7/2012 | Kapich | F02B 37/10 60/606 |

FOREIGN PATENT DOCUMENTS

| | | |
|---|---|---|
| JP | 62-8425 | 1/1987 |
| JP | 62-20219 | 2/1987 |
| JP | 2005-501500 | 1/2005 |
| JP | 2011-21513 | 2/2011 |
| JP | 2011-509375 | 3/2011 |
| JP | 4648347 | 3/2011 |
| JP | 2011-220276 | 11/2011 |
| KR | 2006-0010427 | 2/2006 |
| KR | 2006-0011434 | 2/2006 |
| WO | 03/019785 | 3/2003 |
| WO | 2005/059331 | 6/2005 |
| WO | 2009/087274 | 7/2009 |

OTHER PUBLICATIONS

Decision to Grant a Patent issued Mar. 3, 2015 in corresponding Japanese patent application No. 2012-004297.
International Search Report issued Mar. 26, 2013 in International Application No. PCT/JP2013/050045.
Written Opinion of the International Searching Authority issued Mar. 26, 2013 in International Application No. PCT/JP2013/050045.
"Hybrid Turbocharger with Integrated High Speed Motor-generator", Mitsubishi Heavy Industries, Ltd., Technical Review, Mar. 2007, vol. 44, No. 1.
Office Action issued Nov. 3, 2015 in corresponding Chinese patent application No. 201380005005.7 (with English translation).

* cited by examiner

US 9,284,918 B2

HYBRID EXHAUST GAS TURBOCHARGER

TECHNICAL FIELD

The present invention relates to a hybrid exhaust gas turbocharger, and particularly, to a hybrid exhaust gas turbocharger that is mounted on a marine internal combustion engine, an internal combustion engine for a land generator, or the like.

BACKGROUND ART

As the hybrid exhaust gas turbocharger, a hybrid exhaust gas turbocharger is known, which includes a turbine portion that is driven by exhaust gas introduced from an internal combustion engine, a compressor portion that is driven by the turbine portion to forcibly feed outside air to the internal combustion engine, and a casing that supports the turbine portion and the compressor portion, and in which a muffler that is connected to an intake system of the internal combustion engine and is supported by the casing via the compressor portion is provided on an upstream side of the compressor portion, a shell housing having a recess in an inner portion of the housing is provided at a center portion of the muffler, and a generator is accommodated in the recess (for example, PTL 1).

CITATION LIST

Patent Literature

[PTL 1] Japanese Patent No. 4648347

SUMMARY OF INVENTION

Technical Problem

In the hybrid exhaust gas turbocharger disclosed in PTL 1, a (high-speed induction) generator is adopted, which includes a rotary shaft having a permanent magnet adhering to the outer circumferential surface of the rotary shaft, and a stator coil disposed along an axial direction and a circumferential direction to surround an outside in a radial direction of the permanent magnet. Moreover, it is considered that a movement in the axial direction of the rotary shaft is restrained by a suction force generated between the permanent magnet and the stator coil. Accordingly, in the generator of the hybrid exhaust gas turbocharger disclosed in PTL 1, a restraint mechanism that restrains the movement in the axial direction of the rotary shaft is not required.

However, when the hybrid exhaust gas turbocharger disclosed in PTL 1 is mounted on the internal combustion engine, if vibration generated in the internal combustion engine is increased, the rotary shaft of the generator is moved to a large extent in the axial direction due to the vibration, a load is applied to a flexible coupling which connects the rotary shaft of the generator and the rotary shafts of the turbine portion and the compressor portion, and as a result, the flexible coupling is damaged, and there is a concern that components in the supercharger may be damaged.

The present invention is made to solve the above-described problems, and to provide a hybrid exhaust gas turbocharger capable of preventing the supercharger from being damaged due to a rotary shaft of a generator being moved to a large extent in an axial direction by vibration generated from the internal combustion engine and a rotary portion in contact with a stationary portion in the supercharger when the supercharger is mounted on the internal combustion engine.

Solution to Problem

The present invention adopts the following means to solve the problems.

According to a first aspect of the present invention, there is provided a hybrid exhaust gas turbocharger including: a turbine portion that is driven by exhaust gas introduced from an internal combustion engine; a compressor portion that is driven by the turbine portion to forcibly feed outside air to the internal combustion engine; a generator that includes a rotary shaft connected to rotary shafts of the turbine portion and the compressor portion via a flexible coupling; a casing that supports the turbine portion and the compressor portion; a muffler that is provided on an upstream side of the compressor portion, is connected to an intake system of the internal combustion engine, and is supported by the casing via the compressor portion, in which a shell housing including a recess inside the shell housing is provided at a center portion of the muffler, and the generator is accommodated in the recess; and a restraint mechanism that includes a thrust collar attached to a shaft end of the rotary shaft of the generator positioned on a side opposite to the flexible coupling and two thrust bearings disposed to oppose both end surfaces forming a flange portion of the thrust collar, and is accommodated in a recess formed on a front surface side of the shell housing positioned on a side opposite to the casing.

According to the hybrid exhaust gas turbocharger of the first aspect of the present invention, a movement in an axial direction of the rotary shaft of the generator accommodated in the recess of the shell housing is restrained by the restraint mechanism.

Accordingly, when the hybrid exhaust gas turbocharger is mounted on the internal combustion engine, the supercharger can be prevented from being damaged due to the rotary shaft of the generator being moved to a large extent in the axial direction by vibration generated from the internal combustion engine and a rotary portion in contact with a stationary portion in the supercharger.

In addition, a generator other than a (high-speed induction) generator may be adopted as the generator that is accommodated in the recess of the shell housing.

In the hybrid exhaust gas turbocharger of the first aspect of the present invention, a plurality of permanent magnets may adhere to an outer circumferential surface of the rotary shaft of the generator along a circumferential direction and an axial direction, and a stator coil may be disposed along the circumferential direction and the axial direction to surround the permanent magnets on the outsides in radial directions of the permanent magnets.

According to the hybrid exhaust gas turbocharger, as the generator accommodated in the recess of the shell housing, the (high-speed induction) generator is adopted, which includes a rotary shaft having the permanent magnets adhering to the outer circumferential surface of the rotary shaft, and the stator coil disposed along the axial direction and the circumferential direction to surround the outsides in the radial directions of the permanent magnets.

Accordingly, a thrust force applied to the thrust collar and the thrust bearing can be decreased, and as the thrust collar and the thrust bearing, a thrust collar and a thrust bearing having low capability and a small size can be adopted, and a reduction in size of the shell housing can be realized.

In the hybrid exhaust gas turbocharger, an opening end, formed on the front surface side of the shell housing, of the recess in which the restraint mechanism is accommodated may be closed by a cover, and a recess that introduces lubricating oil, which is scattered to an inner surface of the cover after being supplied to the thrust bearing, into a lubricating oil discharging channel provided on a bottom portion of the front surface side of the shell housing may be provided on the inner surface of the cover.

According to the hybrid exhaust gas turbocharger, the lubricating oil lubricating the thrust bearing is more smoothly discharged.

Accordingly, the amount of the lubricating oil supplied to the thrust collar and the thrust bearing can be increased, and thus, the thrust collar and the thrust bearing can be more actively cooled.

Moreover, it is possible to simply access the thrust collar and the thrust bearing by simply removing the cover, and maintenance properties can be improved.

According to a second aspect of the present invention, there is provided an internal combustion engine including the above-described hybrid exhaust gas turbocharger.

According to the internal combustion engine of the second aspect of the present invention, even when the hybrid exhaust gas turbocharger is mounted on the internal combustion engine, since the internal combustion engine includes the hybrid exhaust gas turbocharger capable of preventing the supercharger from being damaged due to the rotary shaft of the generator being moved to a large extent in the axial direction by vibration generated from the internal combustion engine and the rotary portion in contact with the stationary portion in the supercharger, reliability of the internal combustion engine can be improved.

Advantageous Effects of Invention

According to the hybrid exhaust gas turbocharger of the present invention, it is possible to prevent the supercharger from being damaged due to the rotary shaft being moved to a large extent in the axial direction by vibration generated from the internal combustion engine itself and the rotary portion in contact with the stationary portion in the supercharger.

DESCRIPTION OF EMBODIMENTS

Hereinafter, an embodiment of a hybrid exhaust gas turbocharger according to the present invention will be described with reference to FIGS. 1 to 3.

Figure 1:
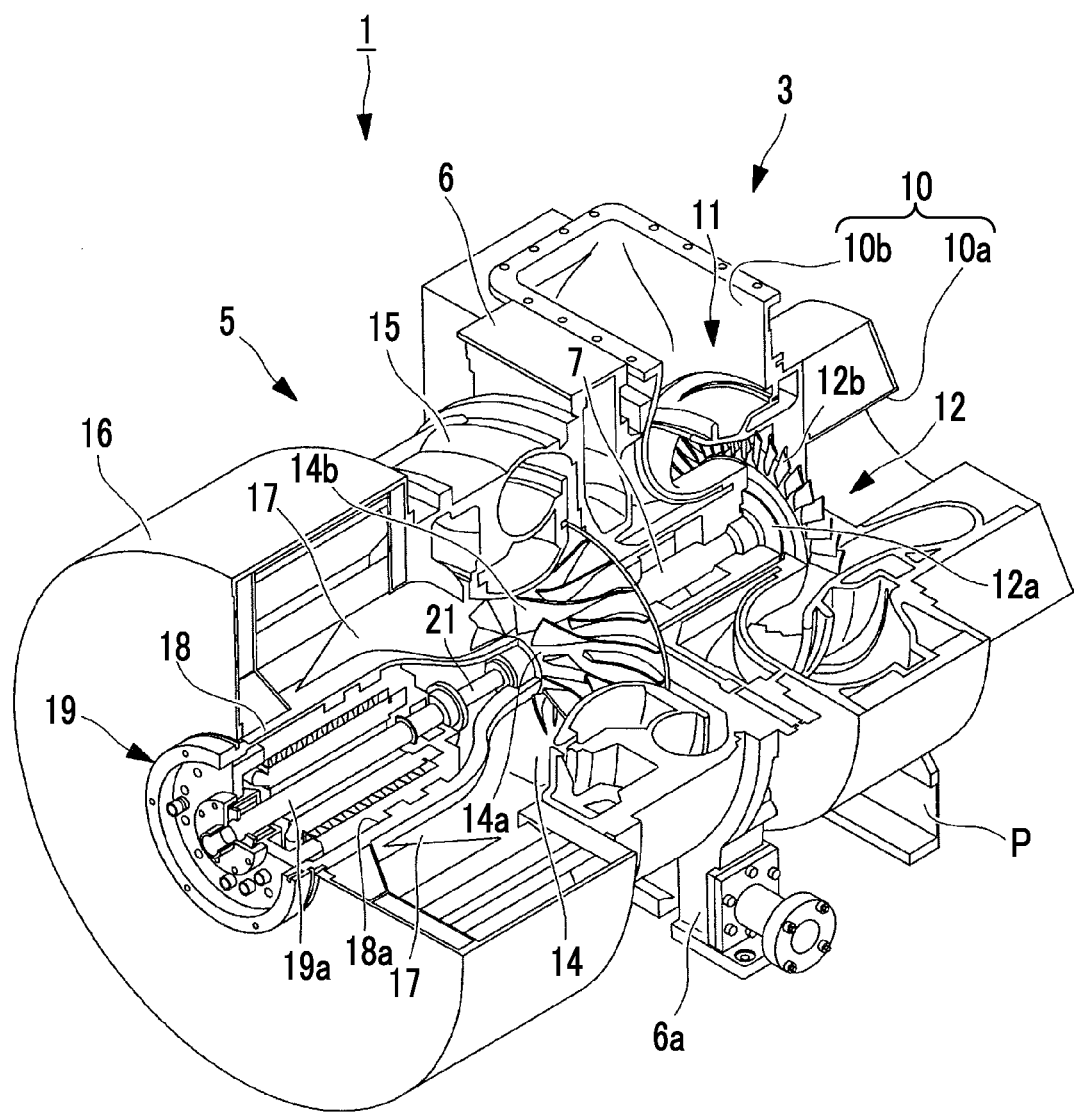
FIG. 1 is a partially cut perspective view when a hybrid exhaust gas turbocharger according to an embodiment of the present invention is viewed from a muffler side.
Figure 2:
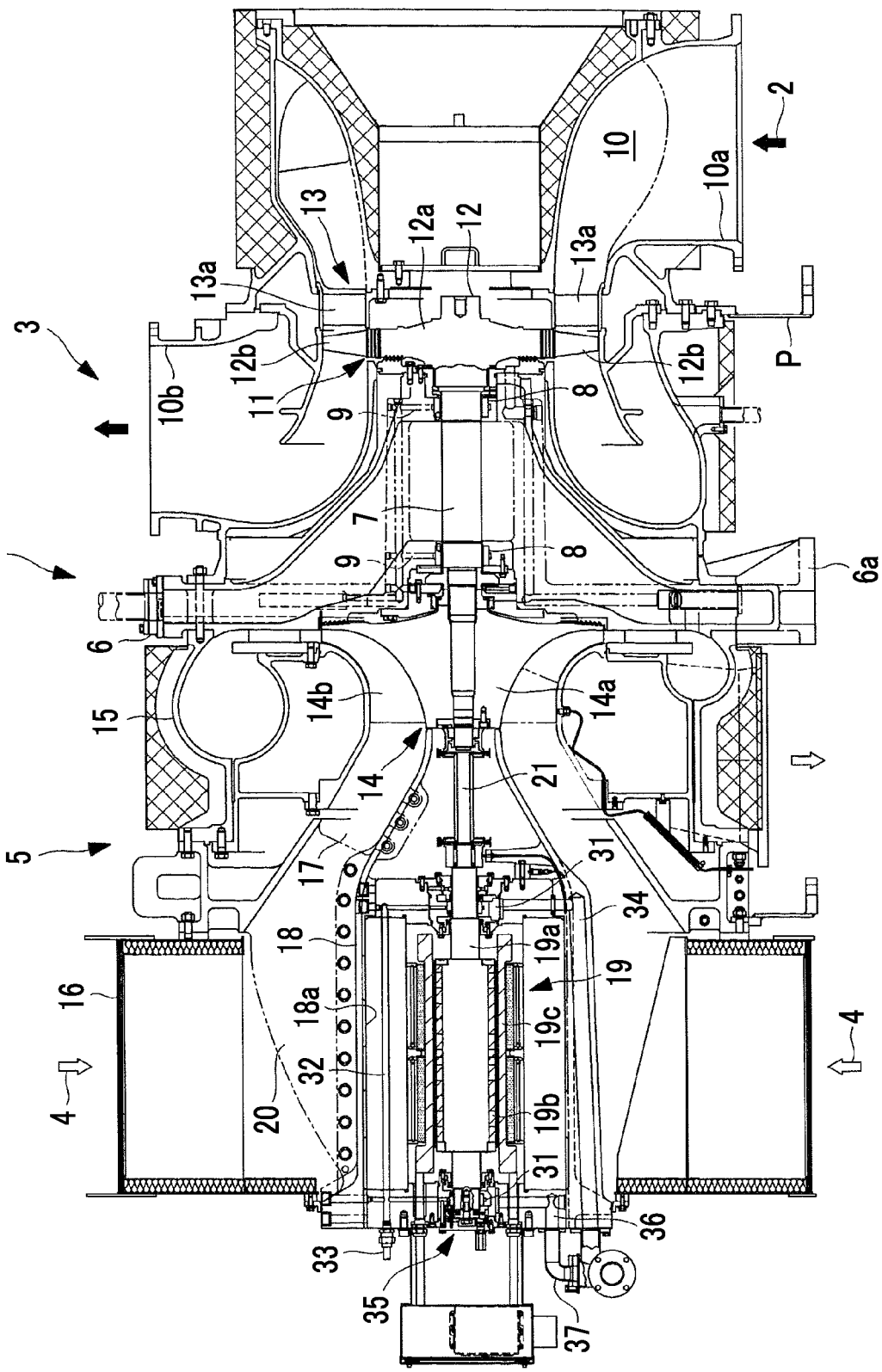
FIG. 2 is a longitudinal cross-sectional view of the hybrid exhaust gas turbocharger according to the embodiment of the present invention.

As shown in at least one of FIGS. 1 and 2, a hybrid exhaust gas turbocharger 1 according to the present embodiment includes a turbine portion 3 that is driven by exhaust gas (combustion gas) 2 introduced from an internal combustion engine (not shown) (for example, a diesel engine, a gas turbine engine, or the like), a compressor portion 5 that is driven by the turbine portion 3 to forcibly feed outside air 4 to the internal combustion engine, a casing 6 that is provided between the turbine portion 3 and the compressor portion 5 to support the turbine portion and the compressor portion, and a generator 19 having a rotary shaft 19a connected to a rotary shaft 7 of the turbine portion 3 and the compressor portion 5 via a flexible coupling 21, as main elements.

The rotary shaft 7, in which one end protrudes toward the turbine portion 3 side and the other end protrudes toward the compressor portion 5 side, is inserted into the casing 6. The rotary shaft 7 is rotatably supported around an axis by a bearing 8 that is provided in the casing 6. Moreover, a lubricating oil supply channel 9, through which lubricating oil is supplied from an oil tank (not shown) (lubricating oil reservoir) to the bearing 8, is provided in the casing 6.

Meanwhile, in a lower end of the casing 6, a leg 6a that supports the casing 6 at one point in an axial direction of the rotary shaft 7 (may support the casing at two or more points in a direction orthogonal to the axial direction of the rotary shaft 7) is provided, and the leg 6a is fixed to a base (not shown) that is provided on a floor surface. That is, weight of the hybrid exhaust gas turbocharger 1 is transmitted to the base via the leg 6a.

Moreover, a reference numeral P in the drawings indicates a punching plate. In the punching plate P, one end of the punching plate is fixed to the lower end of the turbine portion 3, and the other end is fixed to the base similar to the leg 6a of the casing 6. Moreover, unlike the leg 6a, the punching plate P is not mainly intended to support the weight of the hybrid exhaust gas turbocharger 1, and is mainly intended to receive thermal expansion in the axial direction of the casing 6 while preventing the hybrid exhaust gas turbocharger 1 from swinging (vibrating) with respect to the base and to prevent occurrence of thermal stress.

The turbine portion 3 includes an exhaust gas passage 10 which is connected to an exhaust system of the internal combustion engine and to which at least a portion of the exhaust gas 2 is supplied, and a turbine 11 which receives the flow of the exhaust gas 2 supplied into the exhaust gas passage 10 to be rotationally driven.

The turbine 11 includes a turbine rotor 12 and a turbine nozzle 13. The turbine rotor 12 includes a disciform turbine disk 12a that is provided on one end of the rotary shaft 7, and a plurality of sheets of turbine blades 12b that are attached on an outer circumference of the turbine disk 12a and have an aerofoil cross-section.

Moreover, the turbine nozzle 13 is configured by annularly disposing a plurality of sheets of nozzle guide vanes 13a, and is disposed on an upstream side of the turbine blades 12b.

The exhaust gas passage 10 includes a supply channel 10a that is connected to the exhaust system of the internal combustion engine and introduces the exhaust gas 2 into the nozzle guide vanes 13a and the turbine blades 12b, and a discharging channel 10b that is provided toward an outside in a radial direction of the turbine 11 and introduces the exhaust gas 2 passing through the turbine 11 into the outside of the system, an exhaust gas purifier (not shown), an exhaust gas boiler, or the like.

The compressor portion 5 includes a compressor impeller 14 that is rotationally driven to discharge the outside air 4 to an outside in a diameter direction, and a scroll chamber 15 that surrounds the periphery of the compressor impeller 14 and compresses the outside air 4 discharged from the compressor impeller 14.

The compressor impeller 14 includes a hub 14a that is attached to the other end of the rotary shaft 7 and has an approximately disk shape, and a plurality of sheets of blades 14b that extend toward the outside in the radial direction from an outer surface of the hub 14a and are provided in an annular shape along the circumferential direction.

A muffler (silencer) 16 connected to an intake system of the internal combustion engine is disposed to be adjacent to the upstream side of the compressor portion 5, and the outside air 4 passing through the muffler 16 is introduced into the blades 14b of the compressor impeller via an inflow channel 17. Moreover, an intercooler (not shown), a surge tank (not shown), or the like is provided on the downstream side of the compressor portion 5, and after the outside air 4 passing through the scroll chamber 15 passes through the intercooler, the surge tank, or the like, the outside air is supplied to the internal combustion engine.

In a center portion of the muffler 16, a shell housing 18 having a recess (first recess) 18a formed to be tapered toward an end surface of the hub 14a inside the shell housing is provided, and a (high-speed induction) generator 19 is accommodated in the recess 18a. The shell housing 18 is fixed to the compressor portion 5 (a wall surface outside the radial direction that forms the inflow channel 17) via a plurality of sheets (for example, four sheets) of supports 20 provided inside the inflow channel 17. In addition, an outer surface of the shell housing 18 configures a wall surface inside the radial direction that forms the inflow channel 17.

In the generator 19, a rotary shaft 19a of the generator is disposed to be positioned on the same rotational axis as that of the above-described rotary shaft 7, and the rotary shaft 19a is connected to the tip of the one end of the rotary shaft 7, which penetrates the hub 14a and protrudes toward the muffler 16 side, via a flexible coupling 21. That is, the rotary shaft 19a of the generator 19 is rotated along with the rotary shaft 7. A plurality of permanent magnets 19b adhere to the outer circumferential surface of the rotary shaft 19a along the circumferential direction and the axial direction, and a stator coil 19c is disposed along the circumferential direction and the axial direction to surround the permanent magnets 19b on the outsides in the radial directions of the permanent magnets 19b.

In a top portion (upper portion) of a front surface (an end surface of a left side in FIG. 2) of the shell housing 18, inlets of a lubricating oil supply channel 32 introducing lubricating oil are provided on journal bearings 31 that support opposite ends of the rotary shaft 19a of the generator 19 accommodated in the recess 18a by bearings, and an outlet end of a lubricating oil supply pipe 33 including a lubricating oil circulating pump (not shown) in the middle of the lubricating oil supply pipe is connected to the inlet of the lubricating oil supply channel 32.

Moreover, in a bottom portion (lower portion) of the front surface of the shell housing 18, an outlet of a (first) lubricating oil discharging channel 34 that introduces the lubricating oil finishing lubrication of the journal bearing 31 supporting the one end (the end of the side close to the flexible coupling 21) of the rotary shaft 19a by a bearing into the front surface of the shell housing 18, and an outlet of a (second) lubricating oil discharging channel 36 that introduces the lubricating oil finishing lubrication of the journal bearing 31 supporting the other end (the end of the side distant from the flexible coupling 21) of the rotary shaft 19a by a bearing and a restraint mechanism 35 restraining the movement in the axial direction of the rotary shaft 19a into the front surface of the shell housing 18 are provided. Moreover, an inlet end of a lubricating oil discharging pipe 37 that introduces the discharged lubricating oil into the above-described oil tank is connected to the outlets of the lubricating oil discharging channels 34 and 36.

In addition, an inlet end of the lubricating oil supply pipe 33 is connected to the bottom portion (lower portion) of the oil tank, the lubricating oil reserved in the oil tank is forcibly fed into the lubricating oil supply channel 32 by the above-described lubricating oil circulating pump, and after the lubricating oil lubricates the journal bearings 31 and a thrust bearing 35 of the generator 19, the lubricating oil returns to the oil tank via the lubricating oil discharging channels 34 and 36 and the lubricating oil discharging pipe 37.

Moreover, the outlet of the lubricating oil discharging channel 34 is positioned below the outlet of the lubricating oil discharging channel 36. In addition, the lubricating oil discharging pipe 37 is configured so that the lubricating oil discharged from the outlet of the lubricating oil discharging channel 34 and the lubricating oil discharged from the outlet of the lubricating oil discharging channel 36 combine with each other in the vicinity of the front surface of the shell housing 18, and thus, in a state where the lubricating oil discharged from the outlet of the lubricating oil discharging channel 34 and the lubricating oil discharged from the outlet of the lubricating oil discharging channel 36 are mixed with each other, both return to the oil tank.

Figure 3:
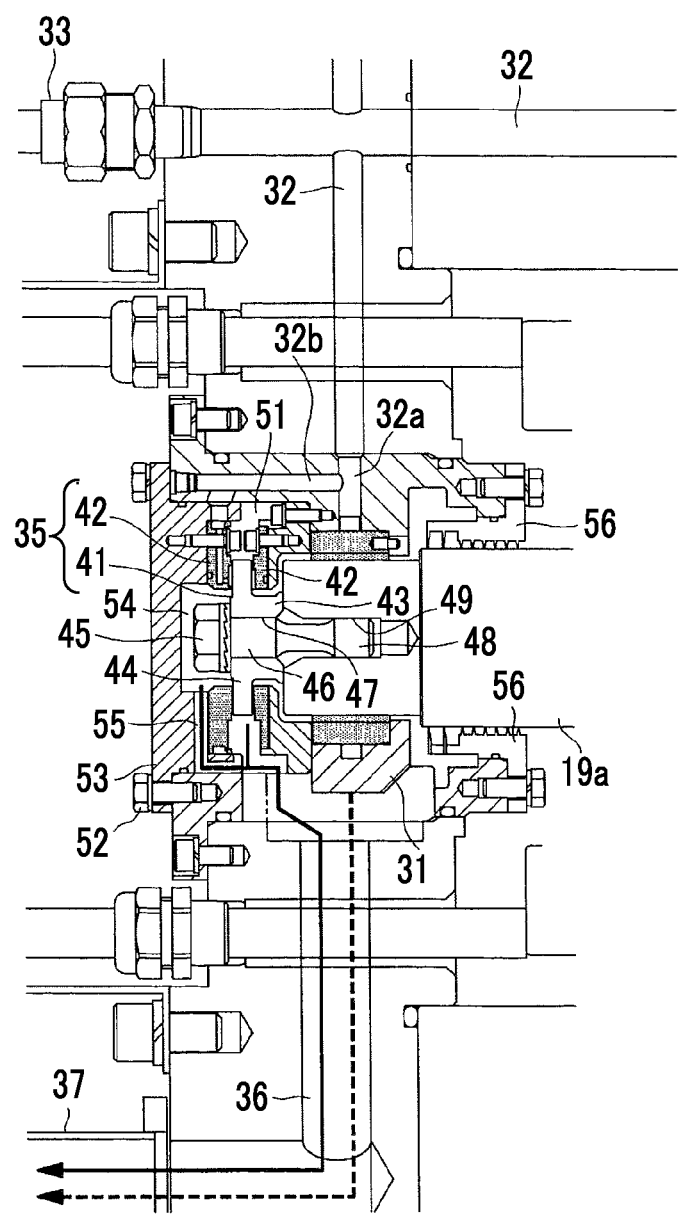
FIG. 3 is a main portion enlarged view in which a main portion of FIG. 2 is shown to be enlarged.

In the hybrid exhaust gas turbocharger 1 according to the present embodiment, as shown in FIG. 3, the restraint mechanism 35 that restrains the movement in the axial direction (right-left direction in FIG. 3) of the rotary shaft 19a is provided on the other end of the rotary shaft 19a.

The restraint mechanism 35 includes a thrust collar 41 and thrust bearings (taper land bearings in the present embodiment) 42.

The thrust collar 41 includes a shaft portion 43 having a cylindrical shaped appearance, and a flange portion 44 extending to the outside in the radial direction along the circumferential direction from one end of the shaft portion 43. Moreover, a reamed through hole (reamer hole) 47, into which a reamer portion 46 of reamer bolt 45 is inserted, is provided at a center portion in a diameter direction of the shaft portion 43.

In addition, a hole 49 receiving a shaft portion 48 of the reamer bolt 45 is bored at the center portion in the diameter direction of the one end surface of the rotary shaft 19a. Moreover, a male screw portion (not shown) is provided on the outer circumferential surface of the shaft portion 48, and a female screw portion (not shown) that is screwed to the male screw portion provided on the outer circumferential surface of the shaft portion 48 is provided on the inner circumferential surface of the hole 49.

One thrust bearing 42 is provided to oppose the one end surface (the surface that is positioned inside when the thrust collar is attached to the other end of the rotary shaft 19a via the reamer bolt 45 and opposes the other end surface of the rotary shaft 19a) of the flange portion 44 of the thrust collar 41, and another thrust bearing 42 is provided to oppose the other end surface (the surface that is positioned on the front side when the thrust collar is attached to the other end of the rotary shaft 19a via the reamer bolt 45 at the side opposite to one end surface) of the flange portion 44 of the thrust collar 41.

The lubricating oil supply channel 32 that supplies the lubricating oil to the journal bearing 31 supporting the other end of the rotary shaft 19a by a bearing and the restraint mechanism 35 is divided into a lubricating oil supply channel 32a that supplies the lubricating oil to the journal bearing 31 and a lubricating oil supply channel 32b that supplies the lubricating oil to the thrust bearing 42 disposed to oppose the other end surface of the flange portion 44 in the vicinity of the upstream side of the journal bearing 31.

After the lubricating oil supplied to the journal bearing 31 via the lubricating oil supply channel 32a lubricates the journal bearing 31, the lubricating oil drops, and as shown by a dashed line arrow in FIG. 3, the lubricating oil is introduced into the lubricating oil discharging pipe 37 through the lubricating oil discharging channel 36.

Meanwhile, after the lubricating oil supplied to the journal bearing 31 via the lubricating oil supply channel 32b lubricates two thrust bearings 42, the lubricating oil drops, and as shown by a solid line arrow in FIG. 3, the lubricating oil is introduced into the lubricating oil discharging pipe 37 through the lubricating oil discharging channel 36.

In addition, an opening end of a recess (second recess) 51, in which the restraint mechanism 35 is accommodated, is closed (sealed) by a cover 53 that is attached via a bolt 52. In addition, on an inner surface (a surface that is positioned on the inside when the cover is attached via the bolt 52 and opposes a head top surface (surface) of the reamer bolt 45) of the cover 53, a recess (fourth recess) 54 that receives the head portion of the reamer bolt 45 and forms a predetermined gap (space) between the recess and the head portion of the reamer bolt 45, and a recess (third recess) 55 that introduces the lubricating oil scattered to the gap formed between the recess 54 and the head portion of the reamer bolt 45 into a portion below the thrust bearing 42 are provided.

Moreover, after the lubricating oil scattered to the gap formed between the recess 54 and the head portion of the reamer bolt 45 is introduced below the thrust bearing 42 via the gap (space) formed between the thrust bearing 42 disposed to oppose the other end surface of the flange portion 44 and the recess 55, and lubricates two thrust bearings 42, the lubricating oil combines with the dropping lubricating oil, and as shown by the solid line arrow in FIG. 3, the combined lubricating oil is introduced into the lubricating oil discharging pipe 37 through the lubricating oil discharging channel 36.

In addition, the lubricating oil that is scattered to the gap formed between the recess 54 and the head portion of the reamer bolt 45 and is introduced below the thrust bearing 42 via the gap formed between the thrust bearing 42 disposed to oppose the other end surface of the flange portion 44 and the recess 55, the lubricating oil that drops after the oil lubricates two thrust bearings 42, and the lubricating oil that drops after lubricating the journal bearing 31 are mixed with one another while being introduced into the oil tank through the lubricating oil discharging channel 36 and the lubricating oil discharging pipe 37.

Moreover, in the vicinity of the inner side (the one end side of the rotary shaft 19a) of the journal bearing 31 that supports the other end of the rotary shaft 19a by a bearing, a labyrinth seal 56 is provided along the circumferential direction, and thus, the lubricating oil supplied via the lubricating oil supply channels 32a and 32b is prevented from leaking to the inner side of the journal bearing 31 that supports the other end of the rotary shaft 19a by a bearing, that is, the permanent magnet 19b side and the stator coil 19c side.

In addition, thermal expansion in the axial direction of the rotary shaft 19a is absorbed by contraction in the axial direction of the flexible coupling 21.

According to the hybrid exhaust gas turbocharger 1 according to the present embodiment, the movement in the axial direction of the rotary shaft 19a of the generator 19 accommodated in the recess 18a of the shell housing 18 is restrained by the restraint mechanism 35.

Accordingly, when the hybrid exhaust gas turbocharger 1 is mounted on the internal combustion engine, the supercharger can be prevented from being damaged due to the rotary shaft 19a of the generator 19 being moved to a large extent in the axial direction by vibration generated from the internal combustion engine and a rotary portion in contact with a stationary portion in the supercharger.

In addition, a generator other than the (high-speed induction) generator may be adopted as the generator 19 that is accommodated in the recess 18a of the shell housing 18.

In addition, according to the hybrid exhaust gas turbocharger 1 according to the present embodiment, as the generator 19 accommodated in the recess 18a of the shell housing 18, the (high-speed induction) generator 19 is adopted which includes the rotary shaft 19a in which the permanent magnet 19b adheres to the outer circumferential surface and the stator coil 19c disposed along the axial direction and the circumferential direction to surround the outside in the radial direction of the permanent magnet 19b.

Accordingly, a thrust force applied to the thrust collar 41 and the thrust bearing 42 can be decreased, and as the thrust collar 41 and the thrust bearing 42, a thrust collar and a thrust bearing having low capability and a small size can be adopted, and a reduction in size of the shell housing 18 can be realized.

In addition, according to the hybrid exhaust gas turbocharger 1 of the present embodiment, the opening end, which is formed on the front surface side of the shell housing 18 in the recess 51 in which the restraint mechanism 35 is accommodated, is closed by the cover 53. Moreover, the recesses 54 and 55 are provided on an inner surface of the cover 53, the recesses 54 and 55 introduce the lubricating oil, which is supplied to the thrust bearing 42 and thereafter, is scattered to the inner surface of the cover 53, into the lubricating oil discharging channel 36 provided on the bottom portion of the front surface side of the shell housing 18, and thus, the lubricating oil lubricating the thrust bearing 42 is more smoothly discharged.

Accordingly, the amount of the lubricating oil supplied to the thrust collar 41 and the thrust bearing 42 can be increased, and thus, the thrust collar 41 and the thrust bearing 42 can be more actively cooled.

Moreover, it is possible to simply access the thrust collar 41 and the thrust bearing 42 by simply removing the cover 53, and maintenance properties can be improved.

Since the internal combustion engine including the hybrid exhaust gas turbocharger 1 according to the present embodiment includes the hybrid exhaust gas turbocharger 1 capable of preventing the supercharger from being damaged due to the rotary shaft of the generator being moved to a large extent in the axial direction by vibration generated from the internal combustion engine and the rotary portion in contact with the stationary portion in the supercharger, reliability of the internal combustion engine can be improved.

Moreover, the present invention is not limited to the above-described embodiment, and may be modified or changed as necessary within a scope which does not depart from the technical ideas of the present invention.

REFERENCE SIGNS LIST

1: HYBRID EXHAUST GAS TURBOCHARGER
3: TURBINE PORTION
5: COMPRESSOR PORTION
6: CASING
7: ROTARY SHAFT
16: MUFFLER
18: SHELL HOUSING
18A: RECESS
19: GENERATOR
19a: ROTARY SHAFT
19b: PERMANENT MAGNET
19c: STATOR COIL
21: FLEXIBLE COUPLING
35: RESTRAINT MECHANISM

36: LUBRICATING OIL DISCHARGING CHANNEL
41: THRUST COLLAR
42: THRUST BEARING
44: FLANGE PORTION
51: RECESS
53: COVER
54: RECESS
55: RECESS

The invention claimed is:

1. A hybrid exhaust gas turbocharger comprising:
a turbine portion that is driven by exhaust gas introduced from an internal combustion engine;
a compressor portion that is driven by the turbine portion to forcibly feed outside air to the internal combustion engine;
a generator that includes a rotary shaft connected to rotary shafts of the turbine portion and the compressor portion via a flexible coupling;
a casing that supports the turbine portion and the compressor portion;
a muffler that is provided on an upstream side of the compressor portion, is connected to an intake system of the internal combustion engine, and is supported by the casing via the compressor portion, in which a shell housing including a first recess inside the shell housing is provided at a center portion of the muffler, and the generator is accommodated in the first recess; and
a restraint mechanism that includes a thrust collar attached to a shaft end of the rotary shaft of the generator positioned on a side opposite to the flexible coupling and two thrust bearings disposed to oppose both end surfaces forming a flange portion of the thrust collar, and is accommodated in a second recess formed on a front surface side of the shell housing positioned on a side opposite to the casing,
wherein an opening end, formed on the front surface side of the shell housing, of the second recess in which the restraint mechanism is accommodated is closed by a cover, and a third recess that introduces lubricating oil, which is scattered to an inner surface of the cover after being supplied to the thrust bearings, into a lubricating oil discharging channel provided on a bottom portion of the front surface side of the shell housing is provided on the inner surface of the cover.

2. The hybrid exhaust gas turbocharger according to claim 1, wherein a plurality of permanent magnets adhere to an outer circumferential surface of the rotary shaft of the generator along a circumferential direction and an axial direction, and a stator coil is disposed along the circumferential direction and the axial direction to surround the permanent magnets on the outsides in radial directions of the permanent magnets.

3. An internal combustion engine system comprising:
an internal combustion engine;
a turbine portion that is driven by exhaust gas introduced from the internal combustion engine;
a compressor portion that is driven by the turbine portion to forcibly feed outside air to the internal combustion engine;
a generator that includes a rotary shaft connected to rotary shafts of the turbine portion and the compressor portion via a flexible coupling;
a casing that supports the turbine portion and the compressor portion;
a muffler that is provided on an upstream side of the compressor portion, is connected to an intake system of the internal combustion engine, and is supported by the casing via the compressor portion, in which a shell housing including a first recess inside the shell housing is provided at a center portion of the muffler, and the generator is accommodated in the first recess; and
a restraint mechanism that includes a thrust collar attached to a shaft end of the rotary shaft of the generator positioned on a side opposite to the flexible coupling and two thrust bearings disposed to oppose both end surfaces forming a flange portion of the thrust collar, and is accommodated in a second recess formed on a front surface side of the shell housing positioned on a side opposite to the casing,
wherein an opening end, formed on the front surface side of the shell housing, of the second recess in which the restraint mechanism is accommodated is closed by a cover, and a third recess that introduces lubricating oil, which is scattered to an inner surface of the cover after being supplied to the thrust bearings, into a lubricating oil discharging channel provided on a bottom portion of the front surface side of the shell housing is provided on the inner surface of the cover.

4. An internal combustion engine system comprising:
an internal combustion engine;
a turbine portion that is driven by exhaust gas introduced from the internal combustion engine;
a compressor portion that is driven by the turbine portion to forcibly feed outside air to the internal combustion engine;
a generator that includes a rotary shaft connected to rotary shafts of the turbine portion and the compressor portion via a flexible coupling;
a casing that supports the turbine portion and the compressor portion;
a muffler that is provided on an upstream side of the compressor portion, is connected to an intake system of the internal combustion engine, and is supported by the casing via the compressor portion, in which a shell housing including a first recess inside the shell housing is provided at a center portion of the muffler, and the generator is accommodated in the first recess; and
a restraint mechanism that includes a thrust collar attached to a shaft end of the rotary shaft of the generator positioned on a side opposite to the flexible coupling and two thrust bearings disposed to oppose both end surfaces forming a flange portion of the thrust collar, and is accommodated in a second recess formed on a front surface side of the shell housing positioned on a side opposite to the casing,
wherein an opening end, formed on the front surface side of the shell housing, of the second recess in which the restraint mechanism is accommodated is closed by a cover, and a third recess that introduces lubricating oil, which is scattered to an inner surface of the cover after being supplied to the thrust bearings, into a lubricating oil discharging channel provided on a bottom portion of the front surface side of the shell housing is provided on the inner surface of the cover, and
wherein a plurality of permanent magnets adhere to an outer circumferential surface of the rotary shaft of the generator along a circumferential direction and an axial direction, and a stator coil is disposed along the circumferential direction and the axial direction to surround the permanent magnets on the outsides in radial directions of the permanent magnets.

* * * * *